United States Patent [19]
Lakis

[11] Patent Number: 5,864,865
[45] Date of Patent: Jan. 26, 1999

[54] MANAGEMENT INFORMATION BASE LISTING VIEWER

[75] Inventor: David Michael Lakis, Orem, Utah

[73] Assignee: Novell, Inc., Provo, Utah

[21] Appl. No.: 824,081

[22] Filed: Mar. 24, 1997

[51] Int. Cl.[6] .................................................. G06F 17/30
[52] U.S. Cl. ........................ 707/103; 707/10; 707/100; 707/104
[58] Field of Search .................................. 707/102, 103, 707/104, 10, 1, 2, 3, 100, 101, 200, 203, 205; 345/440, 356, 357, 329, 340, 348; 395/183.14, 677, 183.03, 670, 200.33, 182.02, 183; 370/408

[56] References Cited

U.S. PATENT DOCUMENTS

| | | | |
|---|---|---|---|
| 5,388,196 | 2/1995 | Pajak et al. | 345/329 |
| 5,421,015 | 5/1995 | Khoyi et al. | 395/677 |
| 5,572,640 | 11/1996 | Schettler | 345/440 |
| 5,615,323 | 3/1997 | Engel et al. | 345/440 |
| 5,651,006 | 7/1997 | Fujino et al. | 370/408 |
| 5,684,988 | 11/1997 | Pitchaikani et al. | 707/104 |
| 5,701,137 | 12/1997 | Kiernan et al. | 345/340 |
| 5,737,518 | 4/1998 | Grover et al. | 395/183.14 |

OTHER PUBLICATIONS

The Essential Client/Server Survival Guide, 2nd Edition, Orfali et al., p. 597, 1996.
SimpleTester User Guide, Simplesoft, Inc., Jun. 1995.
*MIB Manager Product Information*, Empire Technologies, Inc., Applicant became aware of the World Wide Web publication in May, 1997.

*Primary Examiner*—Wayne Amsbury
*Assistant Examiner*—Srirama Channavajjala
*Attorney, Agent, or Firm*—Dinsmore & Shohl LLP

[57] ABSTRACT

A MIB viewer for displaying objects defined in a MIB listing. The MIB viewer extracts object information from a MIB listing and reorganizes the object information for display to a user in an ordered and easily understandable manner. The MIB viewer separates object names from other object attributes to enable a user to quickly interpret the relationship among the objects in the MIB listing. Upon request, the attributes associated with any particular object can be displayed in a separate window. Another embodiment of the MIB viewer organizes the object names into a hierarchical structure and displays a graphical hierarchical structure showing the parent/child relationship between the objects in the MIB listing. Upon selection of an object name, the attributes associated with the object will be displayed in a separate window.

18 Claims, 10 Drawing Sheets

MANAGEMENT INFORMATION BASE LISTING VIEWER

FIELD OF THE INVENTION

This invention relates to the field of network management, and in particular relates to a method and system for displaying the contents of a management information base in an organized and understandable manner.

BACKGROUND OF THE INVENTION

As networks have proliferated, so too have the number of network-attached devices, such as servers, printers, bridges, routers and the like. Frequently these devices are geographically far removed from one another, even when attached to the same LAN, and managing such devices has become a major burden on network administrators. The Simple Network Management Protocol (SNMP) was designed to facilitate management of such devices from a central location.

SNMP allows a management software application running from a central location, such as a workstation, to query and or modify various objects associated with an SNMP-enabled device. Each SNMP-enabled device implements an SNMP agent, and the objects supported by any particular agent are defined in a source code listing referred to as a Management Information Base (MIB) listing. The MIB listing defines each object in terms of its attributes, such as its name, syntax, object identifier, access, status, and description. The management application reads the MIB listing to determine what objects a particular agent supports, whether the object can be read and/or written, the type of object (e.g., numeric, or string), and its object identifier. The object identifier is made up of a series of digits and periods, and is used to uniquely identify a particular object in an SNMP request from the management application.

The objects in a MIB are organized in a hierarchy which is established by the object identifier. The hierarchy is in the form of a tree, with each object being either a parent object, a child object, or a parent and child object. Parent objects are used to organize related child objects. For example, a group object is a parent object to certain child objects which somehow relate to the group object. Similarly, a table object is composed of rows, or sequences, of child objects. The hierarchy of such parent and child objects, however, is not easily determined from looking at the MIB listing, as the objects in a MIB listing merely follow one another sequentially.

To implement a MIB in an SNMP agent, or to determine what objects are implemented in a MIB, the MIB listing must be analyzed. Unfortunately, MIB listings can be very difficult to interpret because the definition of each object appears to be independent of every other object, and the parent/child relationship between the objects can be difficult to determine. MIB listings are created using a syntax referred to as Abstract Syntax Notation one (ASN.1), which requires that objects be defined in terms of its attributes, such as a name, an object identifier, a syntax, an access, a status, and optionally a description. Although optional, descriptions are widely used in practice to describe the purpose and use of the object and can be quite lengthy. The effect of this is that a single page of a MIB listing may contain the definition of only two or three objects. MIB listings frequently define hundreds of objects, resulting in MIB listings over 100 pages in length. Not only does such length make it difficult to locate a particular object, but can also make determining the hierarchy of the objects in the MIB very difficult. Although a text editor can be used to electronically search for the name of an object, it is presented without a context—that is without indicating where the object exists with respect to other objects.

For example, when examining a particular object in a MIB listing, either from a hard copy printout or from a computer screen, one cannot easily determine what objects are child objects of a particular object, or what attributes a parent object has. In fact, the parent object could be listed on a page 25 pages previous to the object of interest. Nor can one easily obtain an overall view of the hierarchy of the MIB. This is especially important when designing the layout of the MIB to ensure that the objects are implemented in a logical manner.

SUMMARY OF THE INVENTION

It is one object of this invention to provide a method and system for interpreting a MIB listing, organizing the objects from the MIB listing into categories of objects, and displaying the names of the objects based upon a selected category.

It is another object of this invention to provide a method and system for interpreting a MIB listing, and graphically displaying the hierarchical parent/child relationship of the objects from the MIB listing.

It is yet another object of this invention to provide a method and system for interpreting a MIB listing, segregating the names of the objects in the MIB listing from the other attributes of the objects, and outputting the object attribute information in an ordered manner.

Additional objects, advantages and other novel features of the invention will be set forth in part in the description that follows and, in part, will become apparent to those skilled in the art upon examination of the invention. To achieve the foregoing and other objects and in accordance with the purposes of the present invention, a method and system is provided for displaying object information from a MIB listing on a display device. The method includes reading a MIB listing, parsing the objects in the MIB listing, and determining the parent/child hierarchy between the objects. According to one embodiment of this invention, a user can select a certain type, or category, of object to display, and the names of the objects of that type are displayed in a user interface window. The object names can be displayed based upon a common parent object, and selection of a parent object can result in the display of the names of all child objects. Thus, a user can quickly traverse through the parent/child hierarchy of objects. Because the object names alone are displayed in the user interface window, without the various other object attributes defined in the MIB listing, the user can quickly identify the objects of interest, and easily determine which objects are related by a common parent. Upon selection by a user of a particular child object name, attribute information associated with that object, such as an object identifier, a syntax, an access, and a description of the object is shown in a separate window.

According to another embodiment of this invention, a graphical tree structure showing the parent/child hierarchy between all the objects in a MIB listing is displayed. Upon user selection of any object in the tree, a window is generated containing the attribute information relating to the selected object, such as the object identifier of the object, the syntax of the object, the access of the object, the status of the object, and the description of the object. Thus, the sequential layout of objects in a MIB listing are converted into a graphical display showing the parent/child hierarchy of the objects, enabling an individual to quickly grasp the relationship of any object in the MIB with respect to any other object in the MIB.

According to yet another embodiment of this invention, a MIB listing is parsed and interpreted, and a document file is created containing a condensed ordered listing of the names of the objects in the MIB listing, based upon their parent/child relationship with each other. Omitted from the document file are many of the object attributes specified in a MIB listing, such as the description attribute and the status attribute. Thus, the document file can be less than one-fifteenth the size of the original MIB listing, and its parent/child ordering enables one to easily grasp the parent/child relationship between the objects.

Still other objects of the present invention will become apparent to those skilled in this art from the following description wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to present preferred embodiments of the invention, examples of which are illustrated in the accompanying drawings, wherein like numerals indicate the same elements throughout the views.

DETAILED DESCRIPTION

Figure 1:
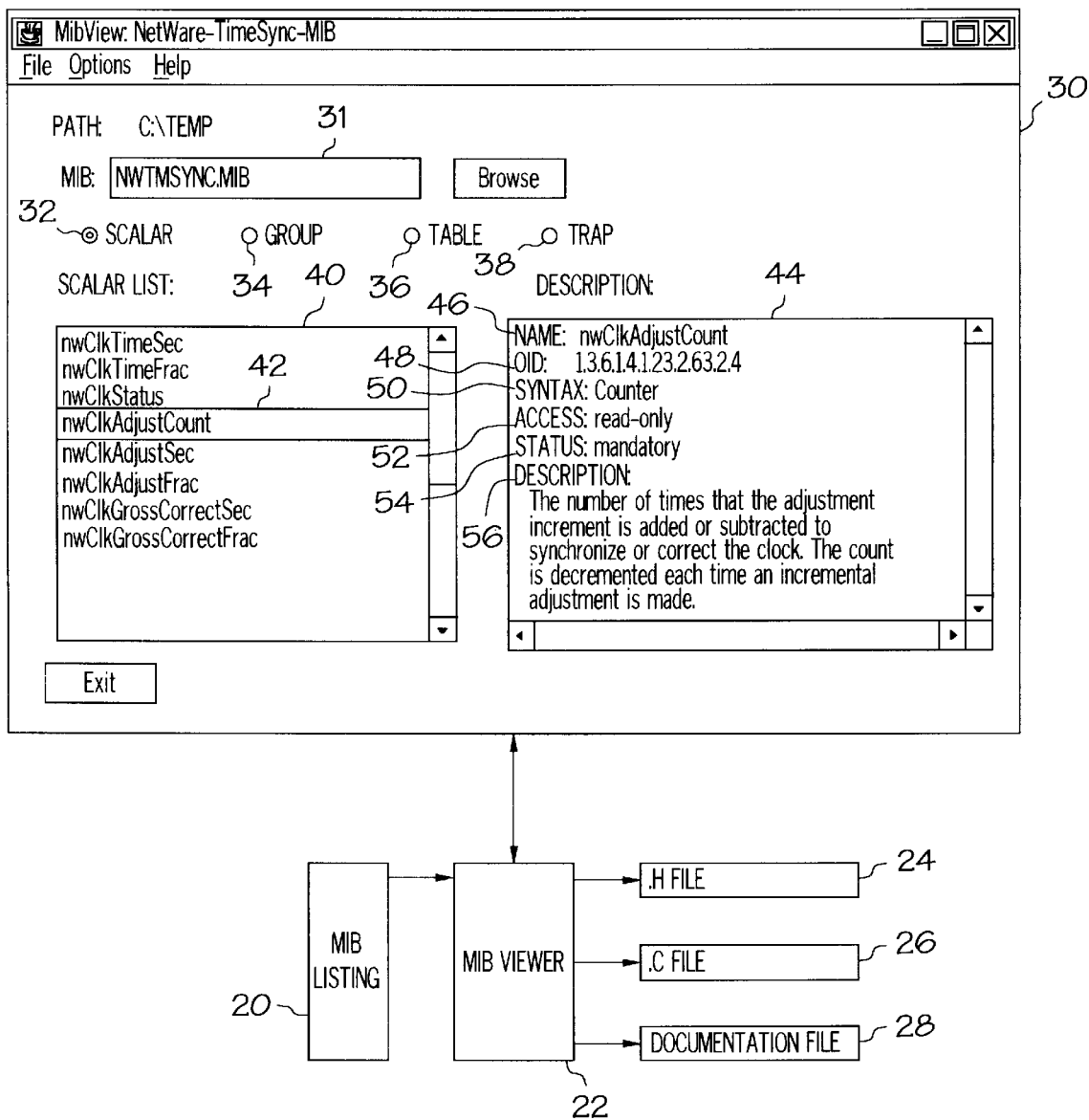
FIG. 1 is a block diagram and display window showing a MIB viewer according to one embodiment of this invention.

As used herein the phrase "MIB listing" refers to a listing having a predetermined syntax for defining managed objects used in network management protocols such as SNMP or CMIP, for example. In the SNMP environment, a MIB listing defines the objects which are implemented in an SNMP agent. Objects typically are described in terms of attributes, such as an object name, an object identifier, an object syntax, an object access, an object status, and an object description. This is conventionally referred to as Abstract Syntax Notation one (ASN.1). The word objects, as used herein, refers to scalar objects, group objects, table objects, objects which compose a sequence, or rows of a table object, trap objects and other entities defined in ASN.1 syntax as objects. The ASN. 1 syntax is not a concise syntax, which can result in MIB listings being over 100 pages in length. Objects in a MIB have a hierarchical parent/child relationship with respect to each other, each object being either a parent object to a child object, a child object to a parent object, or a parent object and a child object. The hierarchical relationship is established through the object identifier of each object. An object identifier comprises a value such as '1.3.4.6.4.5.23.43.2.3'. This value can either be specified explicitly in the MIB listing, or indirectly by specifying the name of the parent object, and a unique child object number, such as "nwTimeSync 3". Thus, it is difficult for an individual, merely by viewing the MIB listing, to discern the hierarchical parent/child relationship between objects.

For example, a group object is a parent object to one or more scalar and table objects. A group object is used to organize child objects having some functional relationship. When examining a MIB listing, it can be difficult to locate the definition of a group object of any particular child object, since the group object could have been defined many pages previous to the definition of the child object. Similarly, a table object comprises rows, or sequences, of objects related by function. When a sequence comprises a large number of objects, it can be difficult to locate the definition of the parent table object when examining the child objects. Another problem is that the syntax for defining any object, whether the object be a group, a table or a scalar object, is very nearly identical, which makes it extremely difficult to determine where one group or table begins, and another group or table ends. This inability to easily analyze the objects in a MIB listing can increase the difficulty of implementing a MIB in an SNMP agent. Moreover, because several people are frequently involved in the implementation of a MIB in an SNMP agent, group discussions regarding the objects in a MIB listing can be hindered because of the difficulty in finding objects in a MIB listing, and the difficulty in determining the hierarchical relationship of the objects with respect to each other.

An example of several MIB object definitions are provided below, in Table 1.

TABLE 1

```
nwServerTimeType OBJECT-TYPE
    SYNTAX INTEGER {
            unknown(0),
            client(1),
            secondary(2),
            primary(3),
            reference(4),
            single(5)
    }
    ACCESS read-only
    STATUS mandatory
    DESCRIPTION
        "The type of this time server:
```

TABLE 1-continued

```
        0 = Unknown
        1 = Client
        2 = Secondary
        3 = Primary
        4 = Reference
        5 = Single"
    ::= { nwTimeSync 7 }
--  DS Time source Table
nwTimeSourceTable OBJECT-TYPE
    SYNTAX SEQUENCE OF NwDSTimeEntry
    ACCESS not-accessible
    STATUS mandatory
    DESCRIPTION
        "A list of time sources for this server.
        Although this table is manually configured,
        you can choose to have SAP discover new
        time sources and add them to this list."
    ::= { nwTimeSync 8 }
nwTimeSrcEntry OBJECT-TYPE
    SYNTAX NwDSTimeEntry
    ACCESS non-accessible
    STATUS mandatory
    DESCRIPTION
        "A description of a particular time source
        in the time source table."
    INDEDX {nwTimeServerID}
    ::= { nwTimeSourceTable 1 }
NwDSTimeEntry ::= SEQUENCE {
    nwTimeServerID        INTEGER,
    nwSrcTblServerTime    DateAndTime,
    nwSrcDiscrepInSec     INTEGER,
    nwSrcDiscrepInFrac    INTEGER,
    nwRemoteServerType    INTEGER,
    nwRemoteServerStatus  INTEGER
    }
nwTimeServerID OBJECT-TYPE
    SYNTAX INTEGER
    ACCESS read-only
    STATUS mandatory
    DESCRIPTION
        "An integer that uniquely identifies a particular
        time source. The server's name or other entry information
        can be obtained querying the reference server table."
    ::= { nwTimeSecEntry 1 }
nwSrcTblServerTime OBJECT-TYPE
    SYNTAX DateAndTime
    ACCESS read-only
    STATUS mandatory
    DESCRIPTION
        "The most recent data and time that
        this time source was polled."
    ::= { nwTimeSrcEntry 2 }
nwSrcDiscrepInSec OBJECT-TYPE
    SYNTAX WholeSeconds
    ACCESS read-only
    STATUS mandatory
    DESCRIPTION
        "The discrepancy (in whole seconds) between
        this server's time and that of the time source.
        This integer is the upper 32 bits of a
        64-bit number with a fixed point between
        the upper and lower 32 bits."
    ::= { nwTimeSrcEntry 3 }
nwSrcDiscrepInFrac OBJECT-TYPE
    SYNTAX FractionalSeconds
    ACCESS read-only
    STATUS mandatory
    DESCRIPTION
        "The discrepancy (in fractional seconds) between
        this server's time and that of the time source.
        This integer is the lower 32 bits of a
        64-bit number with a fixed point between
        the upper and lower 32 bits."
    ::= { nwTimeSrcEntry 4 }
```

As can be readily appreciated from Table 1, MIB listings containing hundreds of object definitions, which is not uncommon, can be extremely difficult to analyze. The MIB viewer according to one embodiment of this invention parses a MIB listing, determines the parent/child relationship between objects in the MIB listing, and outputs the MIB object information in any of several different formats, each of which presents object information in a more concise and understandable manner than the format of a MIB listing. The MIB viewer according to one embodiment of this invention separates the object names from the other object attributes, and outputs the object names according to either their type, or their hierarchical relationship with other objects, while maintaining the ability to display the attributes of any particular object upon request.

Referring now to FIG. 1, a MIB viewer 22 according to one embodiment of this invention is illustrated. MIB viewer 22 reads a MIB listing 20 which is specified in input box 31, and parses the objects defined in the MIB listing. During the parsing step, MIB viewer 22 builds a hierarchical structure which establishes the parent/child relationship of the objects with respect to each other. MIB viewer 22 also preferably categorizes the objects into types of objects, such as scalar objects, group objects, table objects, and trap objects. MIB viewer 22 then displays a window 30 in which a list box 40 is provided containing object names of a particular category, or type, of object. By default, after MIB viewer 22 parses the MIB listing it displays the name of the scalar objects from the MIB listing in list box 40.

MIB viewer 22 allows selection by a user of the various types of object names to display, such as the names of scalar objects, group objects, table objects, and trap objects, via buttons 32, 34, 36 and 38, respectively. Upon user selection of a particular child object name in list box 40, such as object name 42, MIB viewer 22 displays in list box 44 the attribute information associated with the object corresponding to that object name. For example, the attribute information displayed in list box 40 can comprise name field 46, which contains the name of the selected object, object identifier field 48 contains the object identifier of the selected object, syntax field 50 which contains the respective syntax, such as 'counter' or 'integer' or a user-defined syntax, of the selected object, access field 52 which contains the access attribute, such as 'read-only' or 'write', of the selected object, status field 54 which contains the status of the selected object, and description field 56 which contains the description of the selected object. Because the object names are separated from the other object attributes, and displayed adjacent one another in a separate window 40, it is very easy to analyze the objects which compose the MIB listing.

The hierarchical parent/child relationship between objects is established via the object identifier of the object. For example, the object identifier shown in object identifier field 48, "1.3.6.1.4.1.23.2.63.2.4", indicates that the parent object to this object has an object identifier of "1.3.6.1.4.1.23.2.63.2". The last field specified in the object identifier shown in object identifier field 48, ".4" indicates that this is the fourth child object of the parent object. Likewise, the object having an object identifier of "1.3.6.1.4.1.23.2.63" is the parent of the object having the object identifier of "1.3.6.1.4.1.23.2.63.2". As can be appreciated, it is very difficult for an individual to view a MIB listing, and using only the object identifiers, ascertain the hierarchy of the objects in the MIB listing.

MIB viewer 22 can also provide an option for creating a header file 24 containing C-language defines, and a language file 26 containing C-language arrays of attribute information. Header file 24 and language file 26 can be used to implement the objects in MIB listing 20 in an SNMP agent.

According to another embodiment of this invention, MIB viewer 22 can provide an option for specifying the creation of a documentation file 28. Documentation file 28 comprises a condensed and ordered list of the object names from MIB listing 20. An example of a MIB documentation file is provided below in Table 2.

TABLE 2

Filename: NWTMSYNC.MIB
Mibname: NetWare-TimeSync-MIB
----- INDEX --------------------------------
GROUPS
------
    nwTimeClock   1.3.6.1.4.1.23.2.63.2 ***** 1
    nwTimeSync    1.3.6.1.4.1.23.2.63.1 ***** 2
TABLES
------
    nwTimeSourceTable 1.3.6.1.4.1.23.2.63.1.8 ***** 3
    nwTimeClientTable 1.3.6.1.4.1.23.2.63.1.9 ***** 4
----- GROUP LIST --------------------------------
1 nwTimeClock(2) GROUP 1.3.6.1.4.1.23.2.63.2
-----------

| | |
|---|---|
| nwClkTimeSec(1) | INTEGER |
| nwClkTimeFrac(2) | INTEGER |
| nwClkStatus(3) | INTEGER |
| nwClkAdjustCount(4) | Counter |
| nwClkAdjustSec(5) | INTEGER |
| nwClkAdjustFrac(6) | INTEGER |
| nwClkGrossCorrectSec(7) | INTEGER |
| nwClkGrossCorrectFrac(8) | INTEGER |
| nwClkTickIncrement(9) | INTEGER |
| nwClkStdTickIncrement(10) | INTEGER |
| nwClkEventOffset(11) | INTEGER |
| nwClkEventTime(12) | OCTET STRING 8 .. 11 |
| nwClkDayLight(13) | INTEGER 0 .. 1 |
| nwClkTimeZoneOffset(14) | INTEGER |
| nwTzName(15) | 7 ByteString |
| nwTimeZoneString(16) | OCTET STRING 0 .. 255 |
| nwDayLightOffset(17) | INTEGER |
| nwClkDayLightOnOff(18) | INTEGER 0 .. 1 |
| nwClkDayLightStart(19) | OCTET STRING 8 .. 11 |
| nwClkDayLightStop(20) | OCTET STRING 8 .. 11 |

2 nwTimeSync(1) GROUP 1.3.6.1.4.1.23.2.63.1
-----------

| | |
|---|---|
| nwLastSuccessTimeSourceIndex(1) | INTEGER |
| nwLastSuccessfulTimeSync(2) | OCTET STRING 8 .. 11 |
| nwLastAttemptedTimeSourceIndex(3) | INTEGER |
| nwLastAttemptedTimeSync(4) | OCTET STRING 8 .. 11 |
| nwLastTimeSyncStatus(5) | INTEGER 0 .. 2 |
| nwLastTimeInTimeSync(6) | OCTET STRING 8 .. 11 |
| nwServerTimeType(7) | INTEGER 0 .. 5 |

----- TABLE LIST --------------------------------
3 nwTimeSourceTable(8) TABLE 1.3.6.1.4.1.23.2.63.1.8
  nwTimeSrcEntry(1) Index: {nwTimeServerID}
--------------------

| | |
|---|---|
| nwTimeServerID(1) | INTEGER |
| nwSrcTblServerTime(2) | OCTET STRING 8 .. 11 |
| nwSrcDiscrepInSec(3) | INTEGER |
| nwSrcDiscrepInFrac(4) | INTEGER |
| nwRemoteServerType(5) | INTEGER 0 .. 5 |
| nwRemoteServerStatus(6) | INTEGER 0 .. 2 |

4 nwTimeClientTable(9) TABLE 1.3.6.1.4.1.23.2.63.1.9
  nwTimeClientEntry(1) Index: {nwTimeClientServerID}

| | |
|---|---|
| nwTimeClientServerID(1) | INTEGER |
| nwCltTblServerTime(2) | OCTET STRING 8 .. 11 |
| nwClientServerType(3) | INTEGER 0 .. 5 |
| nwClientServerStatus(4) | INTEGER 0 .. 2 |

Documentation file 28 contains an index section which lists each group object name adjacent to each other, and each table object name adjacent to each other. The name of each group object is then separately listed along with the names of each child object of that group object, and each table object name is then separately listed with each child object name associated with that table object. As can be seen from Table 2, many of the attribute fields of each object, such as the description field, the access field and the status field are not shown in documentation file 28. Further, only one line of information is provided regarding each object from MIB listing 20, and thus, in tests, documentation file 28 has frequently been less than one-tenth the size of a complete MIB listing 20. Moreover, documentation file 28 presents the object names in an ordered manner, illustrating the child/parent relationship between group objects and child objects, and table objects and child objects. Thus, documentation file 28 provides a much simpler and easier to interpret view of the objects defined in MIB listing 20, which facilitates individual understanding as well as group discussions of the various objects in MIB listing 20.

Figure 2:
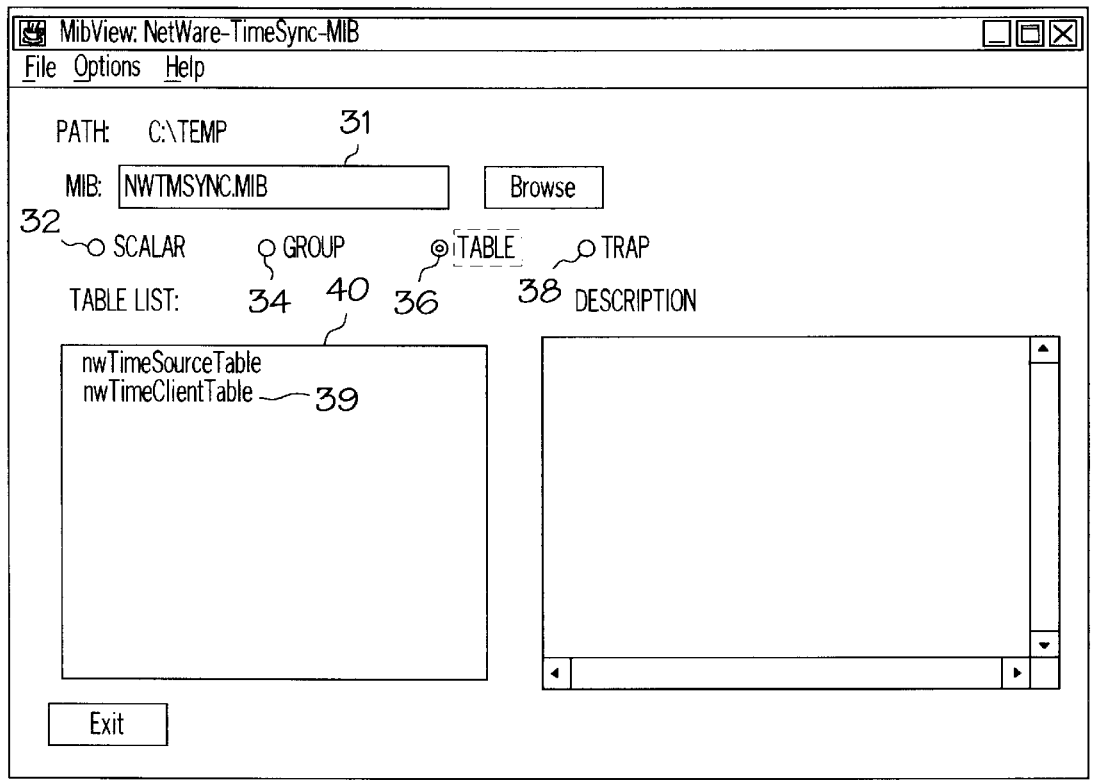
FIG. 2 is a display window showing a listing of table object names according to one embodiment of this invention.
Figure 3:
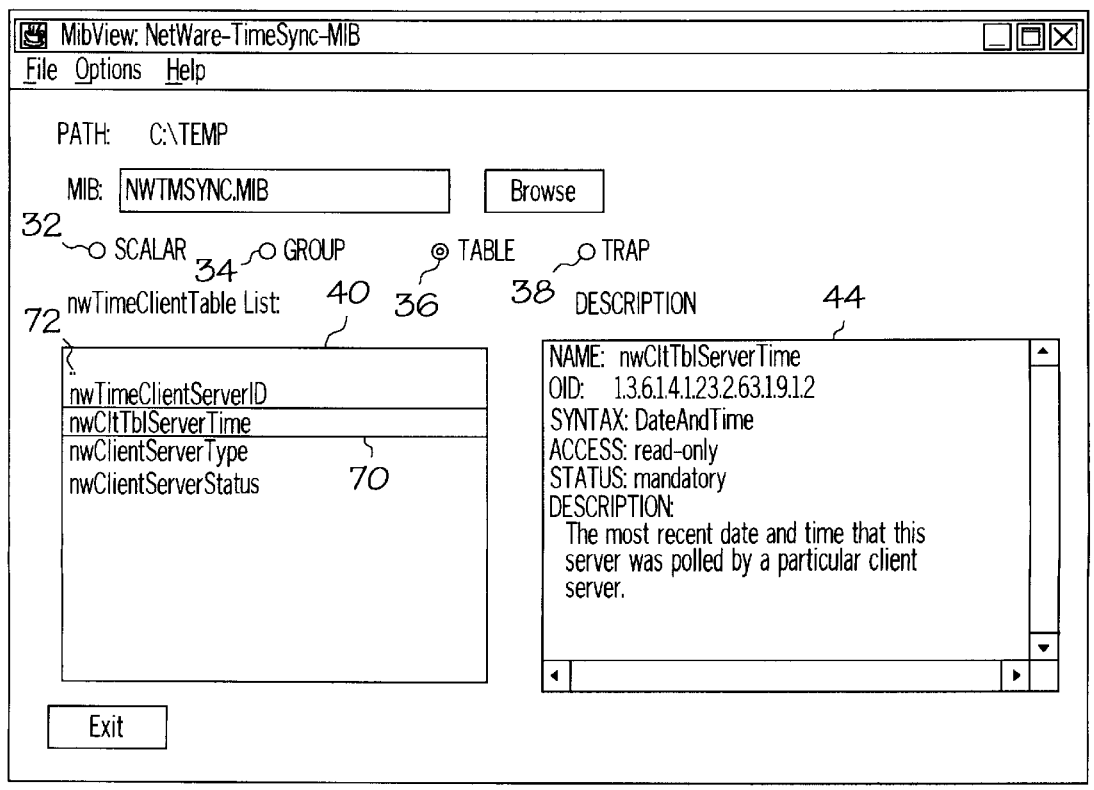
FIG. 3 is a display window showing a plurality of child object names of a table object shown in FIG. 2.

FIG. 2 illustrates a display of the names of table objects upon user selection of button 36. MIB viewer 22 can display object names in list box 40 according to the parent/child hierarchy. For example, upon selection of the name of a parent object, such as table object name 39, a window showing the child object names of the selected object can be shown, as shown in list box 40 in FIG. 3. List box 40 contains the names of the child objects of the table object associated with table object name 39 selected in FIG. 2. Upon selection of a particular child object name, such as object name 70, the object attributes of that particular object can be displayed in list box 44. To return to the parent object name of the child objects shown in list box 40, the user can select parent indicators 72, at which time the list of table object names, as shown in list box 40 of FIG. 2, will be displayed again.

Figure 4:
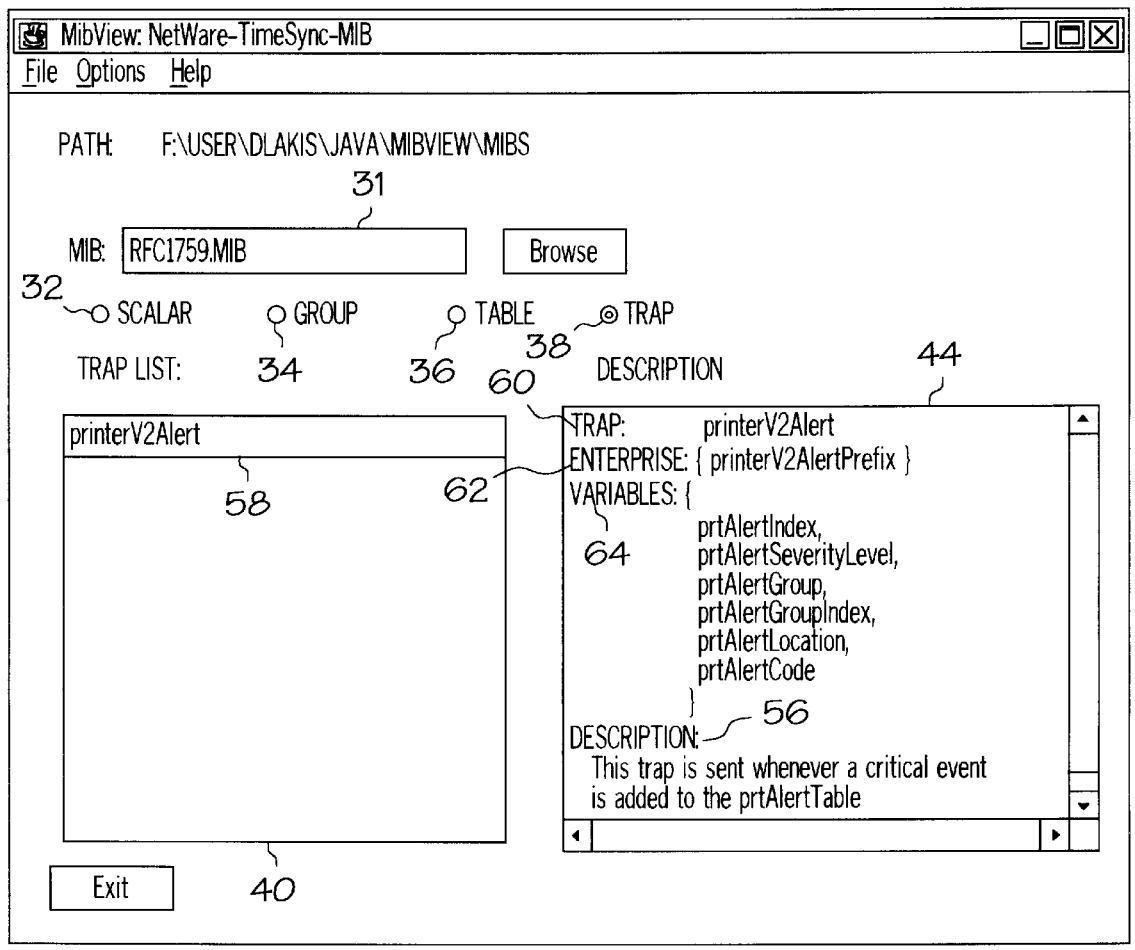
FIG. 4 is a display window showing a listing of trap object names according to one embodiment of this invention.

FIG. 4 illustrates a display of the names of trap objects upon user selection of button 38. In the example shown, only one trap has been defined in the MIB listing identified in input box 31. List box 40 contains the names of each trap object in such MIB. Upon selection of object name 58, MIB viewer 22 will display the trap attributes, such as name field 60, enterprise field 62, variable field 64 and description field 56 in list box 44.

Figure 5:
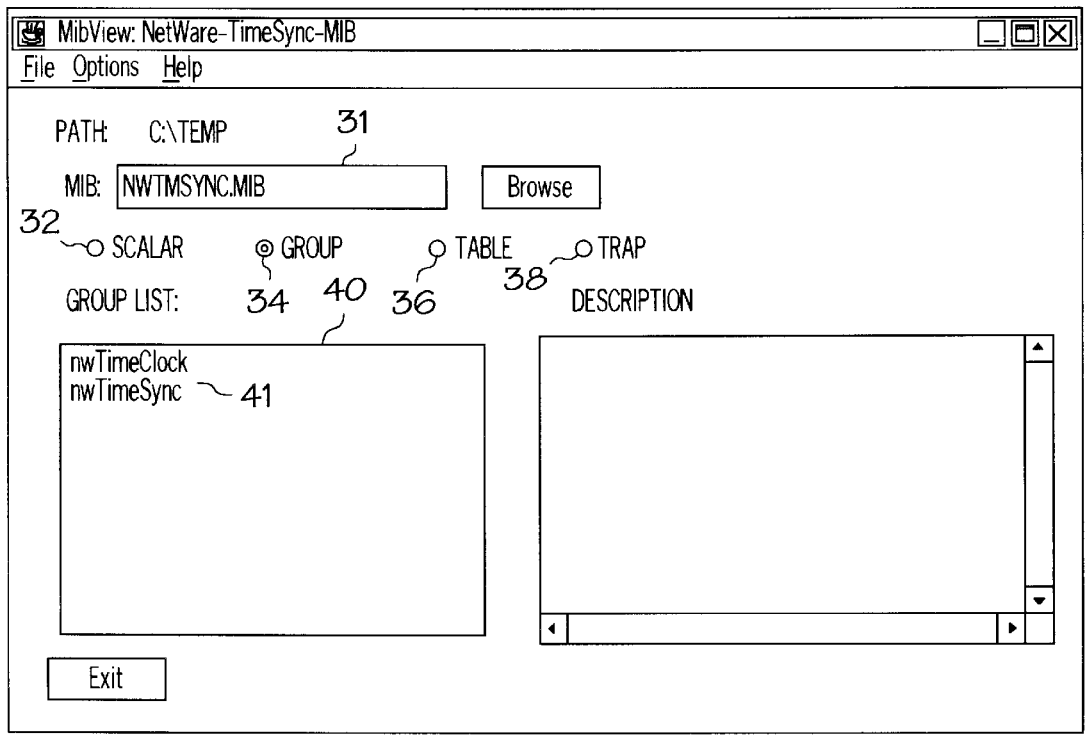
FIG. 5 is a display window showing a plurality of group object names.
Figure 6:
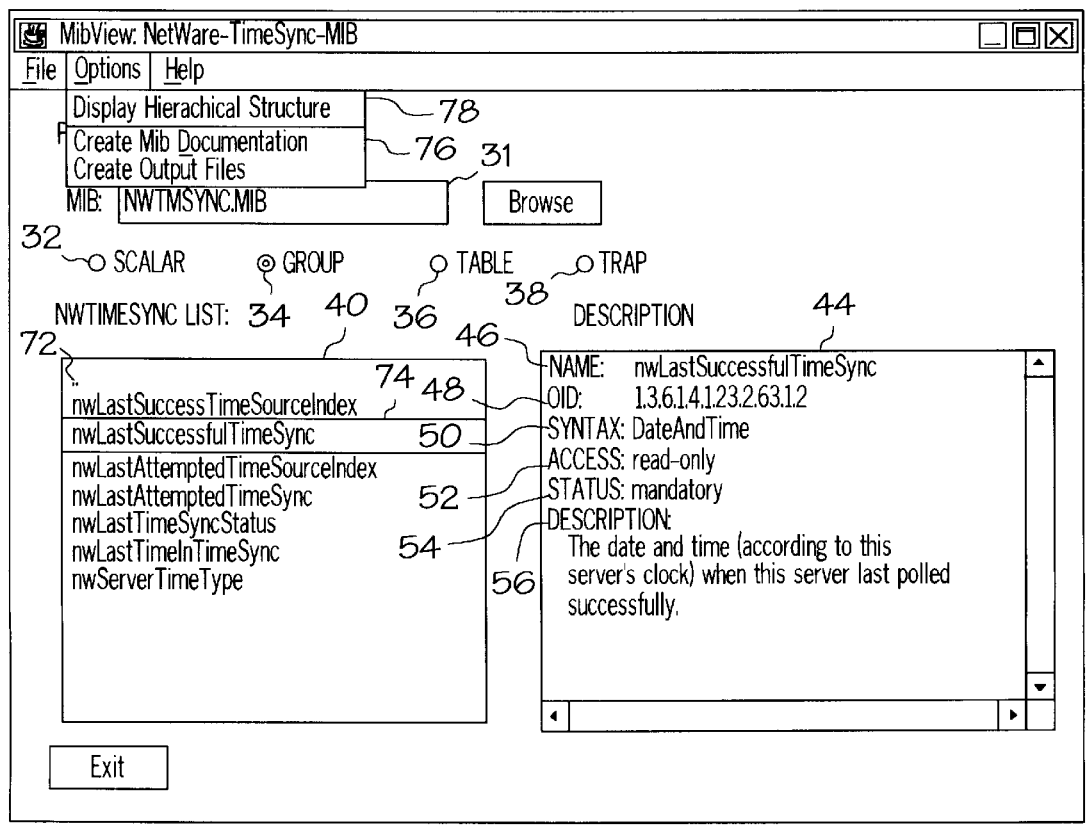
FIG. 6 is a display window showing a plurality of child object names of a group object shown in FIG. 5.

FIG. 5 illustrates a display of the names of group objects upon user selection of button 34. Upon selection of one of the group object names shown in list box 40, such as group object name 41, MIB viewer 22 will display the names of each child object of the group object selected, as shown in list box 40 of FIG. 6. Upon selection of a particular child object name, such as object name 74, MIB viewer 22 will display the attributes associated with the selected object in list box 44. Thus, one can quickly and easily determine which objects are child objects of a particular parent object. To view the name of the parent object of the child objects shown in list box 40, parent indicator 72 can be selected, in which case the group object names, as shown in list box 40 of FIG. 5 will be displayed.

Figure 7:
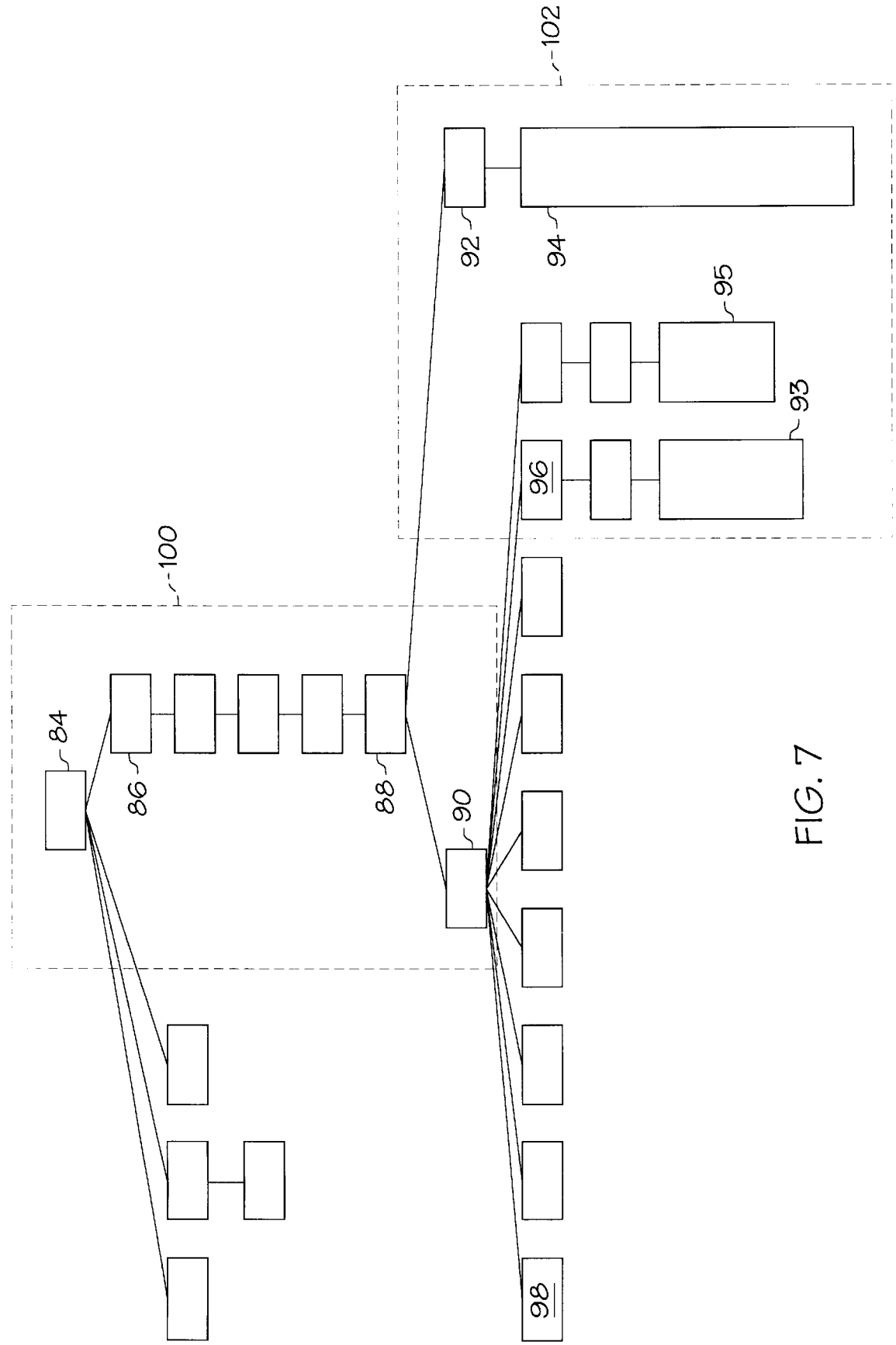
FIG. 7 is a schematic illustrating a graphical hierarchical structure showing the parent/child relationship between objects in a MIB listing according to one embodiment of this invention.

If selection item 78 of options menu 76 is selected, MIB viewer 22 will create and display a window graphically showing the hierarchical parent/child relationship between the objects. FIG. 7 is a block diagram illustrating such a display. With the exception of blocks 93–95, each block shown in FIG. 7 represents a particular object name, as well as the object associated with the object name. For simplicity, the blocks will be referred to as objects. Each of blocks 93-95 represent a plurality of objects. For example, object 86 is a child object of object 84. Object 88 is a parent object of child objects 90 and 92. Because objects 92 and 90 have the same parent, object 88, objects 92 and 90 can be referred to as sibling objects. Likewise, objects 96 and 98 represent sibling objects, each of which has the same parent object, object 90. To illustrate in more detail the graphical hierarchical structure shown in FIG. 7, portions 100 and 102 have been shown in greater detail in FIGS. 8 and 9, respectively.

Figure 8:
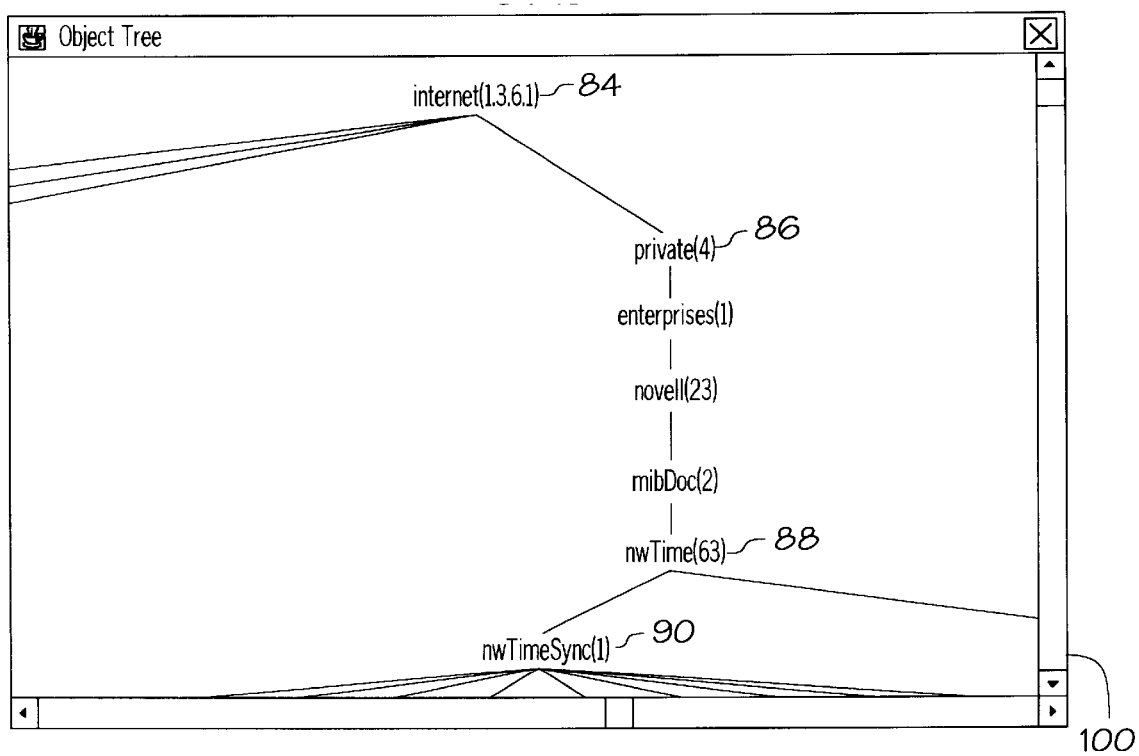
FIG. 8 is a display window showing in greater detail a portion of the schematic shown in FIG. 7.

Referring now to FIG. 8, it can be seen that object 84 is an object named "internet", and has an object identifier of "1.3.6.1". As is appreciated by those skilled in the art, this object is a standard object which is implicitly or explicitly set forth in most MIBs. The object name associated with object 86 is "private" and has an object identifier of "1.3.6.1.4". The object identifier of an object shown in FIG. 8 can be determined by appending a period and the number adjacent the object name, (e.g. "4" for object 86) to the number adjacent the parent object name (e.g. "1.3.6.1"), and so on until the top of the structure is reached (object 84 in this example). For example, object 88 is named "nwTime" and has an object identifier of "1.3.6.1.4.1.23.2.63". Object 88 is a child object of object 86, which in turn is a child object of object 84. Object 90, named "nwTimeSync", is a child object of object 88, and, as illustrated by the lines extending below object 90, is a parent object to certain other child objects.

Figure 9:
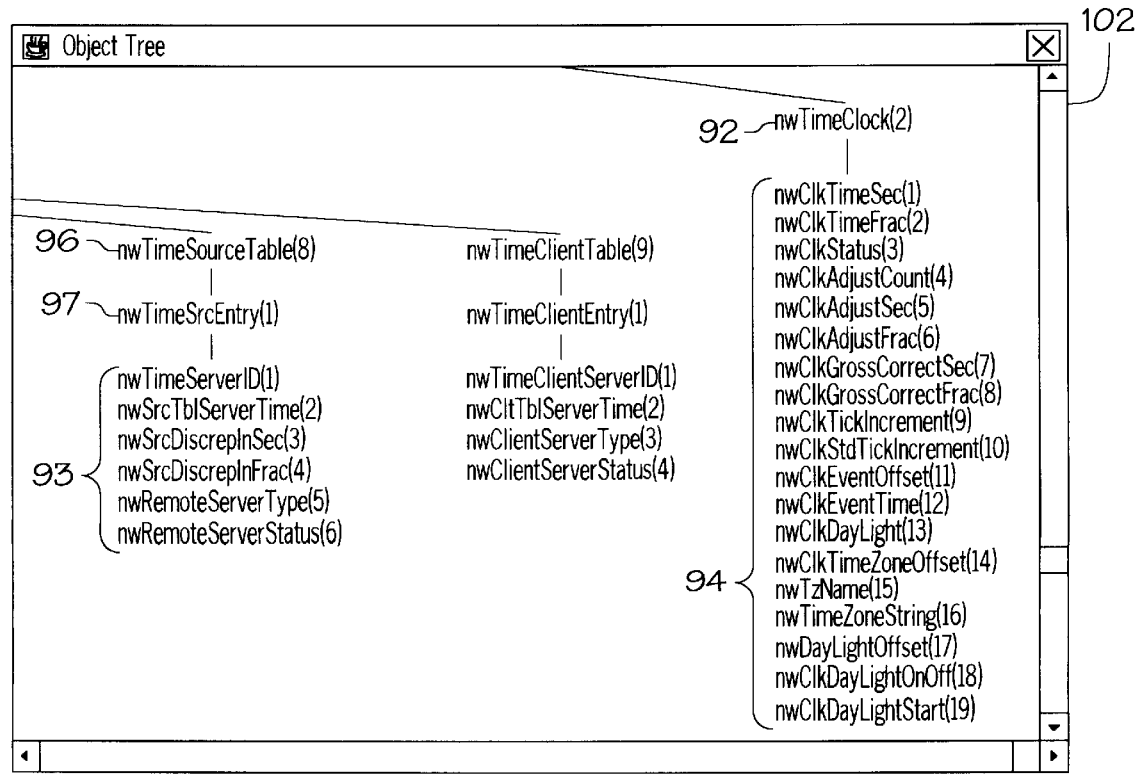
FIG. 9 is a display window showing in greater detail another portion of the schematic shown in FIG. 7.

Referring to FIG. 9, object 92 is a group object, and is a parent object to each of the child objects represented by block 94. Similarly, object 96, "nwTimeSourceTable" is a parent object to object 97 and the child objects represented by block 93. According to one embodiment of this invention, MIB viewer 22 separates with a line the name of a table object, such as object 96, from the name of the object which identifies a sequence of the table, such as object 97, and separates that object with a line from the objects that make up a sequence of the table, such as the objects represented by block 93. This convention makes it very easy to quickly discern which objects are table objects, and which objects compose a sequence of the table.

Figure 10:
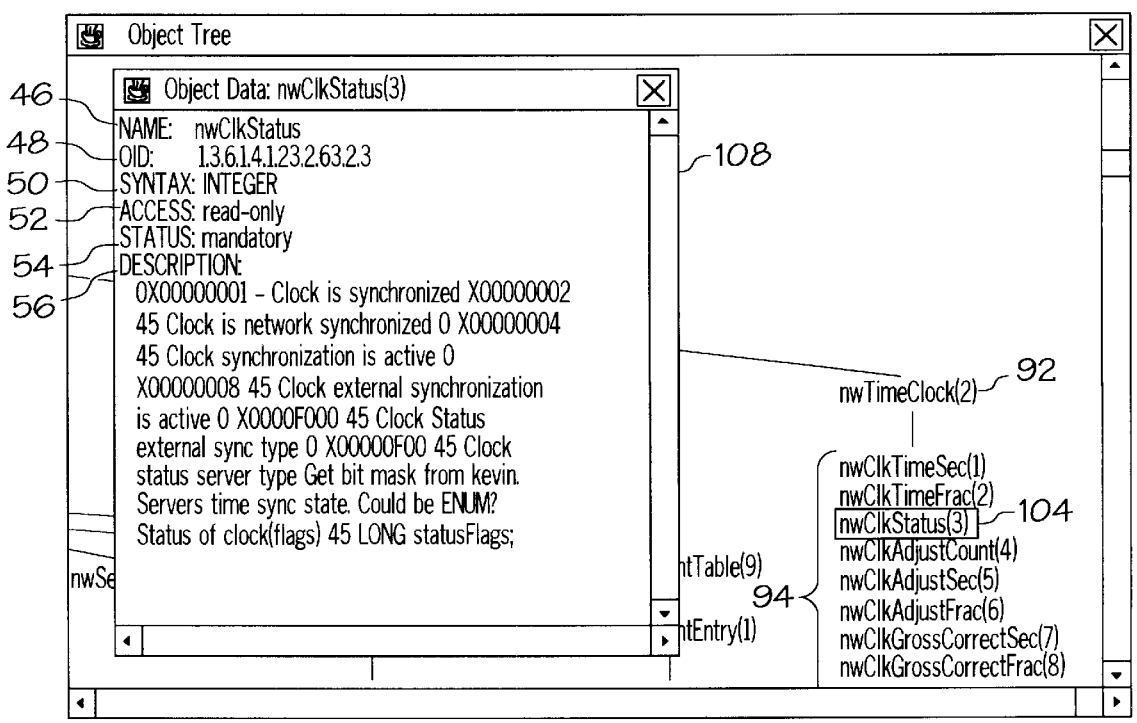
FIG. 10 shows two display windows, an outer display window showing a portion of the schematic shown in FIG. 7, and an inner display window showing attribute information relating to a particular object selected in the outer display window.

According to another embodiment of this invention, a user can select any object displayed in the hierarchical structure shown in FIG. 7 to obtain a list of the attributes associated with that object. For example, as shown in FIG. 10, a user has selected object 104, "nwClkStatus". In response to this selection, MIB viewer 22 obtains the attributes associated with object 104 and displays them in a new window 108. Window 108 contains the various object attributes such name field 46, object identifier field 48, syntax field 50, access field 52, status field 54 and description field 56. Thus, MIB viewer 22 not only displays the graphical hierarchy of objects, but also can display all relevant attribute information of any desired object.

Figure 11:
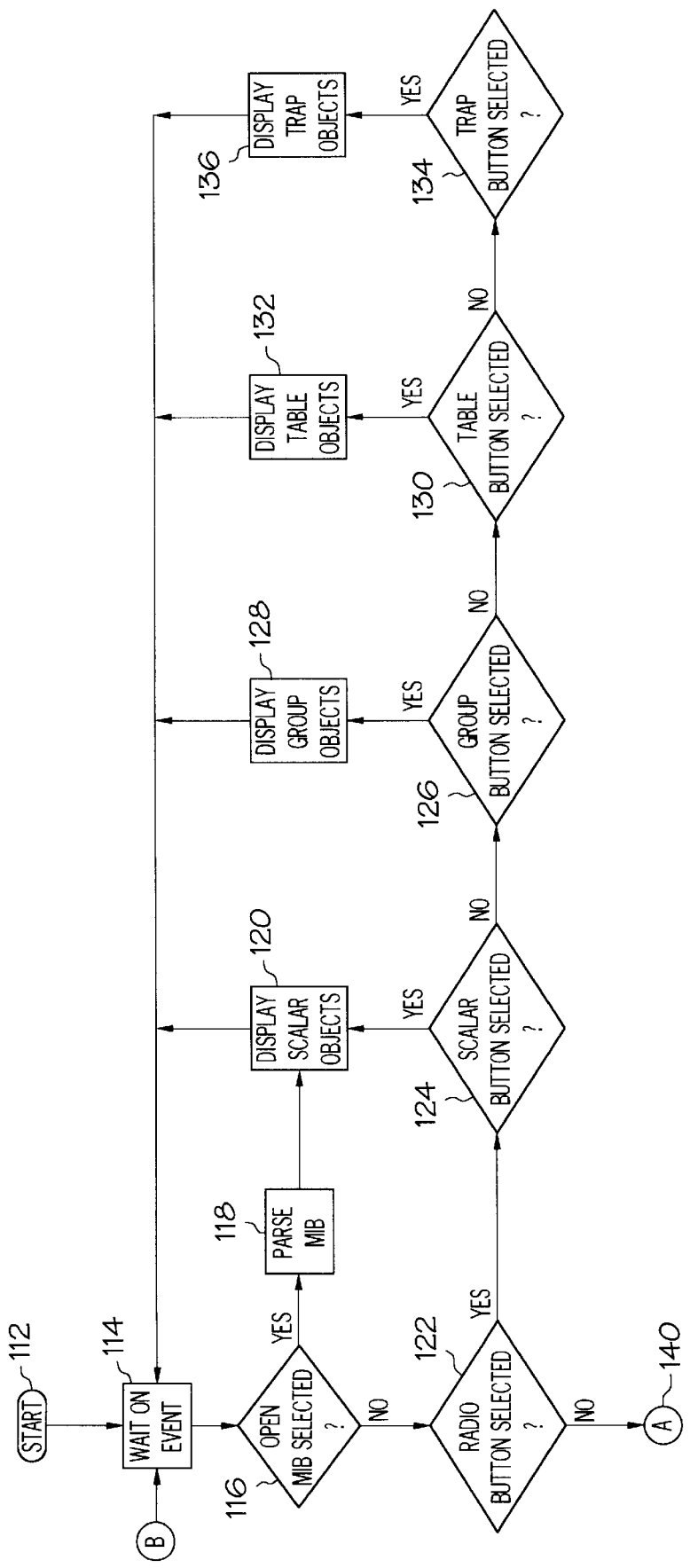
FIGS. 11–12 are flow diagrams illustrating the operation of the MIB viewer according to one embodiment of this invention.
Figure 12:
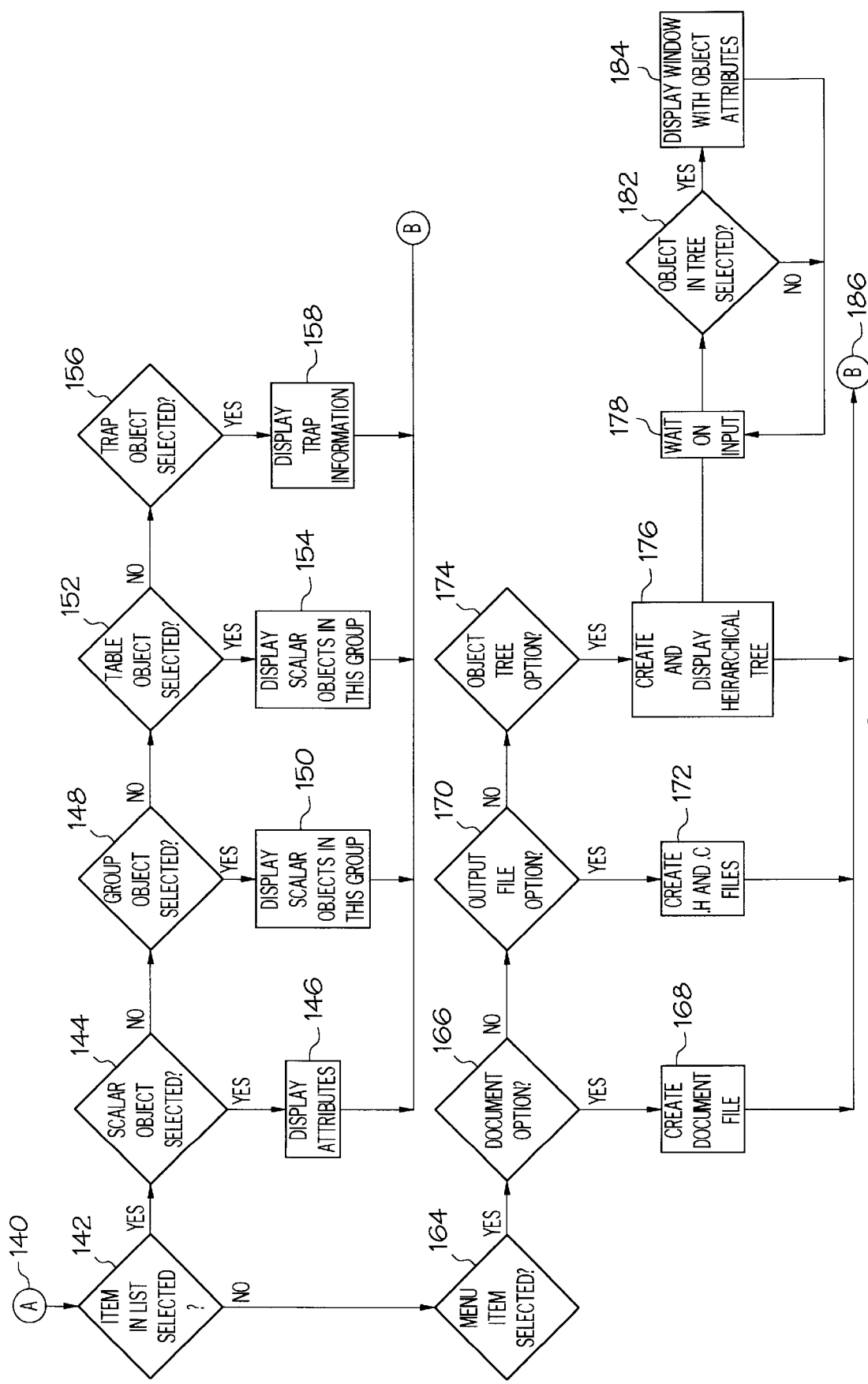

MIB viewer 22 can be developed using any conventional computer language known to those skilled in the art, such as C, C++, or JAVA. MIB viewer 22 can be executed in any conventional computer and on any conventional operating system capable of executing programs written in such languages. MIB viewer 22 could also be encoded in an integrated circuit, such as a ROM, if desired. FIGS. 11–12 are flow diagrams illustrating MIB viewer 22 according to one embodiment of this invention. The program is initiated at step 112. At step 114, MIB viewer 22 awaits input from a user. Upon receiving user input, at step 116 it is determined whether the user has requested that a MIB listing be opened. If so, at step 118, MIB viewer 22 parses the specified MIB listing, and at step 120, displays the object names of the scalar objects defined in the MIB listing. MIB viewer 22 then returns to step 114 where it awaits another user selection.

If, at step 122, it is determined that a user selected a radio button, then, at step 124, MIB viewer 22 determines whether the scalar radio button has been selected. If so, then at step 120 MIB viewer 22 displays the names of the scalar objects from the specified MIB listing and returns to step 114 where it awaits another event. If, at step 126, the group radio button was selected by the user, then at step 128 the names of all group objects from the specified MIB listing are displayed, and control returns to step 114 where MIB viewer 22 awaits another event. If at step 130 the table radio button was selected, then at step 132 MIB viewer 22 displays the names of all table objects from the selected MIB listing and returns to step 114. If, at step 134, the trap radio button was selected, then at step 136 MIB viewer 22 displays the names of all trap objects from the specified MIB listing and returns to step 114 to await another event. As will be discussed in greater detail with reference to FIG. 13, when MIB viewer 22 initially parses the MIB listing, lists of types of objects are created. For example, a list of scalar objects is created, a list of group objects is created, a list of table objects is created and a list of trap objects is created. Such lists allow MIB viewer 22 to rapidly display all objects of a certain type upon request by a user.

Referring now to FIG. 12, at step 142 MIB viewer 22 determines whether a name of an object which had previously been displayed was selected by a user. If so, then at step 144 if the object selected was a child object, then at step 146 MIB viewer 22 displays the attributes associated with the selected object in another window, such as list box 44. Control then returns to step 114. If, at step 148, a group object was selected, then, at block 150, MIB viewer 22 determines the names of the objects which are child objects to the selected group object, and displays the object names of such child objects in list box 40. Control then returns to step 114. If at step 152 a table object was selected, then, at block 154, MIB viewer 22 obtains the child objects which compose a row of the selected table and displays the names of such objects in list box 40. Control then returns to step 114. If, at step 156, a trap object was selected, then at step 158 MIB viewer 22 displays the attributes associated with that trap object in list box 44, as shown, for example, in FIG. 4.

If, at step 164, a menu item was selected, it is determined at step 166 if the "Create MIB Documentation" option was selected. If so, at step 168 MIB viewer 22 creates a document file from the selected MIB listing. If, at step 170, the "Create Output Files" option was selected, then at step 172 MIB viewer 22 creates the ".H" and ".C" files, previously described, which can be used to develop an SNMP agent to implement this MIB. If, at step 174, the "Display Hierarchical Structure" option is selected, then at step 176 MIB viewer 22 creates and displays the hierarchical structure showing the parent/child relationship between each object, such as the structure shown in FIGS. 7–9. If, at step 182, a particular object in the structure is selected, then at step 184 MIB viewer 22 displays a window with the attributes of the selected object.

Figure 13:
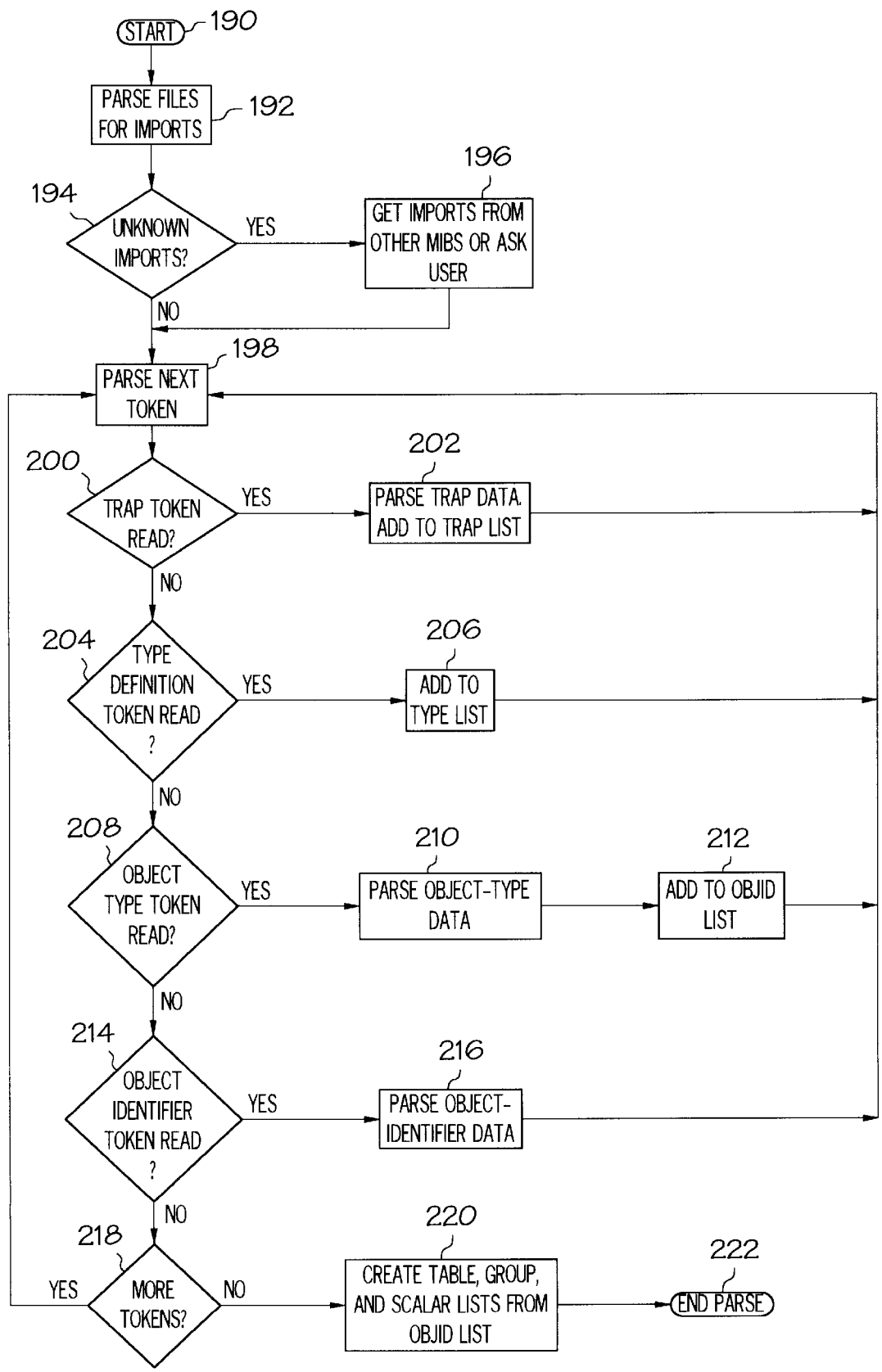
FIG. 13 is a flow chart illustrating in greater detail the parsing aspect of the operation of the MIB viewer shown in FIGS. 11–12.

The parsing process represented by step 118 of FIG. 11 generates certain structures used by MIB viewer 22 to display the object information as described herein. FIG. 13 illustrates a process for parsing a MIB listing according to one embodiment of this invention. General parsing techniques, such as identifying predetermined tokens in a string of data are well known to those skilled in the art, and will not be discussed in detail herein. At step 192, MIB viewer 22 parses the MIB listing for "import" statements, as such statements generally are specified at the beginning of a MIB listing. An import statement references another MIB listing in which parent MIB objects which are not defined in the MIB listing at issue can be found. If, at step 194, the imports cannot be located by MIB viewer 22, then at step 196 a dialog box is presented to a user to indicate the location of the specified import MIB listing. Step 198 begins a loop through the data in the MIB listing in which the data are analyzed for predetermined tokens, such as "TRAP", "::=", or "OBJECT-TYPE", and the like. At step 200, if a trap token is read, then at step 202, MIB viewer 22 parses the trap attributes associated with that trap object and adds the trap to a trap list. Each entry in the trap list is a structure which contains a pointer to the next trap in the list, the object identifier of the trap represented by that particular entry, the name of the trap, and a pointer to a structure in which the attributes of the respective trap are maintained. At step 204, if a type definition token is read, then at step 206 the type definition is added to a type list. A type definition is an optional construct in ASN.1 syntax which allows a user-specified keyword to be associated with a particular string. For example, the following line from a MIB listing, "Whole-Seconds ::=INTEGER" sets the keyword "WholeSeconds" equal to specifying "INTEGER". The more descriptive keyword "WholeSeconds" can now be used in the "SYNTAX" attribute of an object in place of the key word "INTEGER". MIB viewer 22 maintains a list of such type definitions. Upon request, MIB viewer 22 can display a window showing all the type definitions specified in the MIB listing.

If, at step 208, an "OBJECT-TYPE" token is read, then at step 210 the attributes associated with the particular object are parsed, and at step 212 the information is added to an object identifier list. Each entry in the object identifier list, according to one embodiment of this invention, has the following layout:

TABLE 3

| | | |
|---|---|---|
| ObjIdList | next; | // next sibling object identifier |
| String | name; | // this object identifier |
| String | parentName; | // name of the parent |
| String | value; | // value of this object identifier |
| ObjIdList | childPtr; | // point to list of children. |
| ObjectDesc | objData; | |
| int | type; | // TABLE, SCALAR, GROUP |

The "next" field is a pointer to another structure in the object identifier list, which is a sibling of the respective object. The "ParentName" field is a string which contains the name of the parent of this object. The "ObjData" field is a pointer to a structure which contains the attribute values of that respective object from the MIB listing. The "Name" field contains the name of the respective object. The "ChildPtr" field is a pointer to the first child of the respective object. The "Value" field contains the object identifier of the respective object. The "Type" field contains the type of object, such as a table object, a scalar object, or a group object.

When a new object is added to the object identifier list, the object identifier of the new object is used to determine its immediate parent object. If the "ChildPtr" field of the parent object is not NULL, then the object is added to the list maintained through the first child object's "next" field. If the "ChildPtr" field of the parent object is NULL, then the "ChildPtr" field is set to point at the new object. After the object identifier list is created, MIB viewer 22 can quickly determine the parent/child relationship between the objects defined in the MIB listing.

If, at step 214, an "OBJECT IDENTIFIER" token is read, then at step 216 the data associated with that object is parsed, and the object is entered into the object identifier list. "OBJECT IDENTIFIER" tokens are frequently used to define "place holders" in a MIB structure.

If, at step 218, more tokens exist, control returns to step 198 and the next token is parsed. If, at step 218, no more tokens exist, then at step 220, separate table, group, and scalar lists are generated from the object identifier list created at step 212, in order to simplify the selection of objects of a particular type when requested by a user of MIB viewer 22. It is apparent that such separate table, group, and scalar lists are not necessary in view of the existence of the object identifier list, but merely expedite the display of objects by type of object.

The foregoing description of preferred embodiments of the invention has been presented for purposes of illustration and description. It not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for displaying on a display device object attribute information from a MIB listing without the need for accessing an agent over a network, comprising:

reading object attribute information describing a plurality of objects from MIB listing, each object being either a parent object, a child object, or a parent and a child object, the object attribute information for at least some of the plurality of objects including an object name, an object identifier and an object description;

displaying on a display device a plurality of object names of child objects having a common parent;

receiving a selection signal from an input device corresponding to particular object name;

displaying at least one of the object identifier and the object description of the object associated with the particular object name in response to the selection signal.

2. A method according to claim 1, further comprising parsing the object information into a plurality of categories, the categories being based on a type of object.

3. A method according to claim 2, wherein the categories comprise scalar objects, group objects, and table objects.

4. A method according to claim 2, further comprising displaying the names of the categories, and upon receiving user selection of one of the categories, displaying a list of names of objects of the type of category selected.

5. A method according to claim 1, wherein the object attribute information for at least a plurality of objects further comprises a status attribute, an access attribute, and a syntax attribute.

6. A method according to claim 5, further comprising displaying the status attribute, the access attribute, and the syntax attribute of the object associated with the particular object name.

7. A method according to claim 1, wherein the plurality of object names are displayed in a graphical structure showing a parent-child relationship between parent objects and child objects.

8. A method for illustrating on a display device a hierarchical relationship between objects in a MIB listing without the need for accessing an agent over a network, comprising:

reading object attribute information from MIB listing, the object attribute information including an object name and an object identifier for each of a plurality of objects;

determining a hierarchical relationship between each of the plurality of objects as a function of the object identifier associated with each of the plurality of objects;

displaying a hierarchical structure containing the names of the objects showing the parent/child relationship between the plurality of objects.

9. A method according to claim 8, further comprising receiving a signal from an input device corresponding to a particular object name, and in response to the signal displaying the object identifier of the object associated with the object name.

10. A method according to claim 8, wherein the object attribute information further comprises an object description, and further comprising receiving a signal from an input device corresponding to a particular object name, and in response to the signal displaying the object description of the object associated with the particular object name.

11. A method according to claim 8, wherein the hierarchical structure comprises a plurality of nodes, at least some of the nodes having a parent/child relationship with other of the nodes, and the hierarchical structure includes lines extending from at least some of the parent nodes to their respective child nodes.

12. A method according to claim 8, wherein the determining step comprises building a list of objects, each entry in the list being operative to maintain a child list and a sibling list, and as each object in the MIB listing is read, adding the object to the child list of a parent object.

13. A method according to claim 12, further comprising adding the object to a sibling list of a sibling object.

14. A system for displaying object attribute information from a MIB listing without the need to access an agent over a network, comprising;

a display device;

a read process being operative to read object attribute information from MIB listing containing definitions of parent objects, child objects, and parent and child objects, the object attribute information including an object name associated with each object;

a display process being operative to display device a plurality of object names; and selection process being operative to receive a user selection identifying one of the plurality of object names and being operative to determine if the object associated with the object name has a child object, and if so being operative to display the name of the child object.

15. A system according to claim 14, wherein the object attribute information comprises an object identifier and an object description for at least some of the plurality of objects, and further comprising the selection process being operative to display at least one of the object identifier and the object description of the object associated with the object if the object does not have a child object.

16. A system according to claim 15, wherein the object attribute information comprises an object syntax, an object access and an object status, and wherein the selection process is operative to display the object identifier, the object description, the object access and the object status of the object.

17. A system according to claim 14, further comprising a parse process being operative to categorize each of the objects, and being operative to create a list of objects for each of the categories of objects.

18. A system according to claim 14, wherein the object attribute information comprises an object identifier for each object, the object identifier establishing the parent/child relationship of each particular object with the object's parent and children, further comprising a parse process being operative to establish a hierarchical structure of objects as a function of the object identifier.

\* \* \* \* \*